United States Patent
Fu et al.

(10) Patent No.: US 11,406,061 B2
(45) Date of Patent: Aug. 9, 2022

(54) AUTOMATED WALNUT PICKING AND COLLECTING METHOD BASED ON MULTI-SENSOR FUSION TECHNOLOGY

(71) Applicants: ANHUI AGRICULTURAL UNIVERSITY, Hefei (CN); FUYANG XINFENG SEED CO., LTD, Fuyang (CN)

(72) Inventors: Songling Fu, Hefei (CN); Zhaocheng Wang, Hefei (CN); Hua Liu, Hefei (CN); Haoxin Ge, Hefei (CN); Fan Yang, Hefei (CN); Xu Li, Hefei (CN); Yuhua Ma, Hefei (CN); Cheng Huang, Hefei (CN)

(73) Assignees: ANHUI AGRICULTURAL UNIVERSITY, Hefei (CN); FUYANG XINFENG SEED CO., LTD., Fuyang (CN)

( * ) Notice: Subject to any disclaimer, the term of this patent is extended or adjusted under 35 U.S.C. 154(b) by 0 days.

(21) Appl. No.: 17/475,329

(22) Filed: Sep. 14, 2021

(65) Prior Publication Data
US 2022/0124979 A1    Apr. 28, 2022

(30) Foreign Application Priority Data
Oct. 22, 2020   (CN) .......................... 202011137624.X

(51) Int. Cl.
*G06F 7/70* (2006.01)
*G06G 7/00* (2006.01)
(Continued)

(52) U.S. Cl.
CPC ........... *A01D 46/30* (2013.01); *A01D 51/002* (2013.01); *G05D 1/0217* (2013.01);
(Continued)

(58) Field of Classification Search
CPC ...... A01D 46/30; A01D 51/002; G06T 7/579; G06T 2207/10028; G06T 2207/20081;
(Continued)

(56) References Cited

U.S. PATENT DOCUMENTS 3,457,712 A * 7/1969 Gould ..................... A01D 46/26
                                                    56/340.1
3,460,331 A * 8/1969 Galis ...................... A01D 46/26
                                                    56/329
(Continued)

FOREIGN PATENT DOCUMENTS

| CN | 206433397 U | 8/2017 |
| CN | 108617264 A | 10/2018 |

(Continued)

*Primary Examiner* — Harry Y Oh

(57) ABSTRACT

Disclosed is an automated walnut picking and collection method based on multi-sensor fusion technology, including: operation 1.1: when a guide vehicle for automated picking and collection is started, performing path planning for the guide vehicle; operation 1.2: remotely controlling the guide vehicle to move in a park according to a first predetermined rule, and collecting laser data of the entire park; operation 1.3: constructing a two-dimensional offline map; operation 1.4: marking a picking road point on the two-dimensional offline map; operation 2.1: performing system initialization; operation 2.2: obtaining a queue to be collected; operation 2.3: determining and sending, by the automated picking system, a picking task; operation 2.4: arriving, by the picking robot, at picking target points in sequence; operation 2.5: completing a walnut shaking and falling operation; and operation 2.6: collecting shaken walnuts. The provided method can obtain high-precision fruit coordinates and complete autonomous harvesting precisely and efficiently.

8 Claims, 3 Drawing Sheets

(51) Int. Cl.
*G06G 7/76* (2006.01)
*A01D 46/30* (2006.01)
*G06T 7/579* (2017.01)
*G06V 20/10* (2022.01)
*A01D 51/00* (2006.01)
*G05D 1/02* (2020.01)
*G06V 20/68* (2022.01)

(52) U.S. Cl.
CPC ......... *G05D 1/0221* (2013.01); *G05D 1/0274* (2013.01); *G06T 7/579* (2017.01); *G06V 20/10* (2022.01); *G05D 2201/0201* (2013.01); *G06T 2207/10028* (2013.01); *G06T 2207/20081* (2013.01); *G06V 20/68* (2022.01)

(58) Field of Classification Search
CPC .. G05D 1/0217; G05D 1/0221; G05D 1/0274; G05D 2201/0201; G06K 9/00664; G06K 2209/17
See application file for complete search history.

(56) References Cited

U.S. PATENT DOCUMENTS

| | | | | |
|---|---|---|---|---|
| 3,785,131 | A * | 1/1974 | Friday | A01D 46/26 56/340.1 |
| 4,194,347 | A * | 3/1980 | Peters | A01D 46/26 56/329 |
| 5,473,875 | A * | 12/1995 | Zehavi | A01D 46/26 56/340.1 |
| 7,765,780 | B2 * | 8/2010 | Koselka | A01D 46/30 56/10.2 A |
| 9,832,929 | B1 * | 12/2017 | Majors | A01D 46/28 |
| 2004/0112032 | A1 * | 6/2004 | Zehavi | A01D 46/26 56/329 |
| 2004/0112034 | A1 * | 6/2004 | Suter | A01D 46/26 56/340.1 |
| 2004/0112035 | A1 * | 6/2004 | Suter | A01D 46/26 56/340.1 |
| 2004/0163375 | A1 * | 8/2004 | Suter | A01D 46/26 56/328.1 |
| 2004/0221565 | A1 * | 11/2004 | Suter | A01D 46/26 56/340.1 |
| 2011/0022231 | A1 * | 1/2011 | Walker | A01G 3/08 700/259 |
| 2016/0057931 | A1 * | 3/2016 | Reichmuth | A01D 46/264 56/340.1 |
| 2017/0082442 | A1 * | 3/2017 | Anderson | A01B 69/00 |
| 2017/0181383 | A1 * | 6/2017 | Shen | G05D 1/028 |
| 2017/0344238 | A1 * | 11/2017 | Nielsen | A01D 75/00 |
| 2019/0261566 | A1 * | 8/2019 | Robertson | A01D 46/243 |
| 2020/0396900 | A1 * | 12/2020 | Xiong | A01D 46/247 |
| 2021/0029877 | A1 * | 2/2021 | Vandike | A01D 41/127 |
| 2021/0212257 | A1 * | 7/2021 | Zhang | A01D 45/00 |

FOREIGN PATENT DOCUMENTS

| | | |
|---|---|---|
| CN | 108781763 A | 11/2018 |
| CN | 109605375 A | 4/2019 |
| CN | 110114653 A | 8/2019 |
| CN | 110832991 A | 2/2020 |
| CN | 111360780 A | 7/2020 |
| JP | 2011229406 A | 11/2011 |
| KR | 100784830 B1 | 12/2007 |
| WO | 2007088225 A1 | 8/2007 |

* cited by examiner

AUTOMATED WALNUT PICKING AND COLLECTING METHOD BASED ON MULTI-SENSOR FUSION TECHNOLOGY

TECHNICAL FIELD

The present disclosure relates to the field of agricultural automated picking technologies, and in particular to an automated walnut picking and collection method based on multi-sensor fusion technology and robot navigation and positioning technology.

BACKGROUND

Agricultural automation is the current development trend of smart agriculture, and there have been many solutions for automated agricultural picking. E.g.:

Patent application No. CN201810413367.4 proposes an automatic fruit picking method and a robot therefor, the method including: S1: obtaining an image of the fruit to be picked and feeding the image back to an intelligent control system; S2: processing, by the intelligent control system, the image and determining whether the fruit is ripe; in response to the fruit being ripe, performing S3; in response to the fruit being not ripe, repeating at start of S1; S3: locating, by the intelligent control system, the ripe fruit and sending a picking instruction to a picking robot; and S4: controlling, by the intelligent control system, the picking robot to pick the ripe fruit.

Patent application No. CN201910478830.8 proposes a drone-based pecan picking and collection device and method thereof, the picking and collection device including a picking drone device, an identification and positioning system, a fixing device, a picking device, a collection device, and a control center. The identification and positioning system is located above the picking drone, and the fixing device and the picking device are located below the picking drone. According to the recognition and positioning system, the picking drone flies to a designated position. The fixing device is two extended automatic telescopic grippers and is configured to clamp two branches to fix a fuselage of the picking and collection device. Through a servo motor, the picking device realizes an eccentric variable speed rotation of a glass fiber rod, realizes a variable force, a variable position, and a variable angle impact on pecan branches, ensuring that the pecan is shot down. The collecting drone is connected to a collecting net, the shot down pecan falls into the collecting net, and the collecting drone has a built-in pressure sensor.

Patent application No. CN202010640990.0 proposes a fruit simulation picking and transfer intelligent trolley group, which consists of a picking vehicle and a transfer vehicle. The picking vehicle is configured for fruit identification and picking, and the transfer vehicle is configured for fruit transfer and storage. The trolley group provides a potential feasible design of an intelligent agricultural device for automatically picking and transporting fruits.

However, there are many shortcomings in the above solutions: the first option only supports single fruit tree operations, the overall picking operation efficiency is low, and due to dependence on the image sensor, the collection accuracy is not high and the fruit tree is easily damaged; the disadvantage of the second solution is that in addition to the low efficiency of single fruit tree collection, it is difficult to accurately locate and identify the fruit hidden inside through images; the third solution is based on preset black guide lines for guide vehicle positioning, which not only has high initial transformation cost, but also faces the risk of late maintenance.

Therefore, how to overcome the poor positioning accuracy of two-dimensional images and realize more intelligent and efficient automated picking is a major problem that needs to be solved urgently.

SUMMARY OF THE DISCLOSURE

The technical problem to be solved by the present disclosure is to provide an automated walnut picking and collecting method based on multi-sensor fusion technology in response to the defects in the prior art.

To achieve the above purpose, the present disclosure provides the following technical solutions.

The present disclosure provides an automated walnut picking and collection method based on multi-sensor fusion technology, comprising:

operation 1.1: when a guide vehicle for automated picking and collection is started, performing path planning for the guide vehicle;

operation 1.2: remotely controlling the guide vehicle to move in a park according to a first predetermined rule, and collecting laser data of the entire park through a two-dimensional laser sensor arranged on the guide vehicle;

operation 1.3: constructing a two-dimensional offline map through a mapping module of Simultaneous Localization and Mapping (SLAM);

operation 1.4: according to an actual situation of the park, marking a picking road point on the two-dimensional offline map;

operation 2.1: performing system initialization through a system initialization module, comprising: after a picking robot is powered on, initializing an automated picking system, activating sensors, and loading the two-dimensional offline map and the picking road point;

operation 2.2: predicting a maturity of a walnut, positioning a target fruit tree, and obtaining a queue to be collected, further comprising: setting a robot patrol cycle according to a walnut maturity cycle; in each patrol cycle, detecting and predicting the maturity of each fruit tree through the two-dimensional image sensor on the picking robot combined with image recognition technology, where maturity=number of ripe walnuts/number of detected walnuts; and feeding a maturity result of each fruit tree back to a user interaction level, and after the maturity of a corresponding fruit tree is confirmed, adding coordinates of the confirmed corresponding fruit tree to a queue to be collected;

operation 2.3: determining and sending, by the automated picking system, a picking task, comprising: according to the queue to be collected, in response to the number of the picking road points in the queue meets a preset number N, sending coordinates of the queue to be collected to the picking robot; and according to the coordinates, determining, by the picking robot, a corresponding order of picking according to a second predetermined rule;

operation 2.4: arriving, by the picking robot, at picking target points in sequence, comprising: taking a current point of the picking robot as a starting point and a first target picking point as an end point, planning a robot path and sending the robot path to the picking robot for execution; during movement of the robot, matching data obtained from the two-dimensional laser sensor with data of the two-dimensional offline map, updating coordinates of the picking robot at a certain frequency, and guiding the picking robot to move until an Euclidean distance between the coordinates of the picking robot and the first picking target point meets a threshold;

operation 2.5: locating, by the picking robot, coordinates of a trunk and starting a trunk fixture, comprising: recognizing a corresponding trunk in a field of view through a two-dimensional image sensor, obtaining depth information of the corresponding trunk recognized by the image sensor through a three-dimensional depth sensor, and selecting a nearest trunk as a target trunk to be clamped; after determining the trunk to be clamped, sending a three-dimensional pose of the target trunk to a clamping control module, controlling the trunk fixture to clamp the target trunk and shaking at a certain frequency to complete a walnut shaking and falling operation;

operation 2.6: collecting shaken walnuts through a ground-fallen walnut positioning module, comprising: collecting ground image data of ground-fallen walnuts through the two-dimensional image sensor, and detecting locations of the ground-fallen walnuts by an image recognition algorithm; obtaining three-dimensional coordinates of each ground-fallen walnut through sensor calibration technology and a three-dimensional sensor, and controlling a walnut fixture to pick up each ground-fallen walnut and put each ground-fallen walnut into a walnut collection box;

wherein the image recognition algorithm and sensor calibration technology specifically include the following processes:

Step 1: collecting a certain number of walnut image samples, and manually labelling the walnuts in the image samples;

Step 2: training an offline image segmentation network model based on labeled data;

Step 3: collecting calibration board-corresponding coordinate data under two-dimensional and three-dimensional cameras through a calibration board, and calculating optimal external parameters of the two-dimensional and three-dimensional cameras based on the current data through singular value decomposition;

Step 4: software controlling the two-dimensional camera to take pictures and load the offline image segmentation network model;

Step 5: calling the segmentation network model to predict a walnut two-dimensional bounding box;

Step 6: converting the pixel coordinates {X_2d, Y_2d} of a center point of the two-dimensional bounding box to a three-dimensional camera coordinate system through the following formula;

$$s \begin{bmatrix} x_{p2d} \\ y_{p2d} \end{bmatrix} = M1 \begin{bmatrix} X_{c2d} \\ Y_{c2d} \\ Z_{c2d} \\ 1 \end{bmatrix} M2 = \begin{bmatrix} x_{p3d} \\ y_{p3d} \end{bmatrix} \sim \begin{bmatrix} X_{c3d} \\ Y_{c3d} \\ Z_{c3d} \\ 1 \end{bmatrix}$$

where p represents the pixel coordinate system, c represents the camera coordinate system, M1 represents internal parameters of the two-dimensional camera and the three-dimensional camera, M2 represents external parameters of the two-dimensional camera and the three-dimensional camera; ~ represents the relationship between the three-dimensional camera pixel coordinates and the camera coordinates, which is a known quantity;

Step 7: converting all two-dimensional coordinates of the walnut center point to the three-dimensional coordinate system; since there is no significant change in the size of the walnut, setting a search distance D based on three-dimensional coordinates; searching for all three-dimensional coordinates within the distance D based on a total punctuation of each three-dimensional walnut to obtain a three-dimensional coordinate set Ki of each walnut, where i represents the i-th walnut; calculating a three-dimensional coordinate normal vector of each set; combining the walnut three-dimensional coordinates, normal vector, and fixture length to filter the walnuts that can be grasped and set a grasping priority queue;

Step 8: according to the priority queue, controlling the fixture to pick up walnuts and put them into the walnut collection box;

operation 2.7: patrolling all the picking road points in sequence until walnut picking operations at all picking road points are completed, comprising: after picking at a current picking target point is completed, determining whether the walnut picking operations at the all picking points have been completed; in response to the walnut picking operations at the all picking points having not been completed, updating a next picking point to be collected as the first picking point in the queue to be collected, repeating the operations 2.4 to 2.7 until fruit trees in the queue to be collected are collected; and operation 2.8: in response to the walnut picking operations at the all picking points having been completed, returning, by the picking robot, to a fruit collection point to collect all the walnuts.

In some embodiments, in operation 1.1, the path planning follows a path closed loop principle, and a path required by the guide vehicle to travel for mapping is clarified; a walking path is adjusted multiple times according to effect of the two-dimensional offline map; in operation 1.3, after the constructing the two-dimensional offline map, the method further comprises: checking the two-dimensional offline map, and feeding the two-dimensional offline map to the mapping module for intelligent learning according to a checking result.

In some embodiments, the second predetermined rule comprises a Manhattan distance between a fruit tree and the picking robot, a fruit tree maturity, and a manual designation.

To ensure sufficient power, the method further comprises: for each time, recording the number of the picking road points in the collection queue, the length of a walking path of the picking robot, and the battery power consumed; and performing training and learning based on recorded data in a recent period to obtain and store the average power consumed at each picking point and the average power consumed per unit length of walking of the picking robot in a current state;

the operation 2.1 further comprises: after the picking robot is powered on, intelligently setting the preset number N according to a current power, the average power consumed at each picking point, and the average power consumed per unit length of walking of the picking robot.

The operations 1.1 to 1.4 are performed by an offline module, and the operations 2.1 to 2.8 are performed by an online module.

The present disclosure uses multi-sensor fusion technology, image recognition technology, and navigation and positioning technology to comprehensively realize fully automated walnut picking, with the following advantages: (1) the present disclosure greatly improves the accuracy of fruit positioning by combining 2D image sensors and 3D depth sensors for multi-dimensional judgment, compared to the way of using images for fruit positioning in the first and second solutions; (2) the present disclosure combines SLAM technology to achieve automatic navigation and accurate positioning of the robot, which can locate the current position of the robot at a high frequency through offline and online map matching algorithms based on laser data; (3) there is no need to lay guide lines and other preliminary transformation operations and post-maintenance work in the third solution, which is convenient to implement; (4) the trunk clamping and shaking device can obtain the mature fruit of the fruit tree without the inability to pick due to the blocked field of view. Moreover, through the image detection and walnut clamping device after the fall, it can realize fast fruit collection operation and improve the completion of collection. The present disclosure is based on more accurate fruit positioning and robot movement positioning, and finally obtains a high degree of automation and high efficiency of the operation process of the picking robot system.

DETAILED DESCRIPTION

Specific implementation of the present disclosure will be described in further detail below in conjunction with the drawings and embodiments. The following embodiments are to illustrate the present disclosure, but not to limit the scope of the present disclosure.

The present disclosure proposes an automated walnut picking and collection method based on multi-sensor fusion technology. A system operation flowchart is shown in FIG. 1, wherein operations are mainly performed by an offline module and an online module.

The offline module is configured to assist in determination of a picking point through navigation and positioning technology, including: collecting laser data in a park by controlling a guide vehicle, and establishing a two-dimensional map of the park through an offline mapping module of Simultaneous Localization and Mapping (SLAM) to provide first-hand map information for subsequent picking points.

Figure 1:
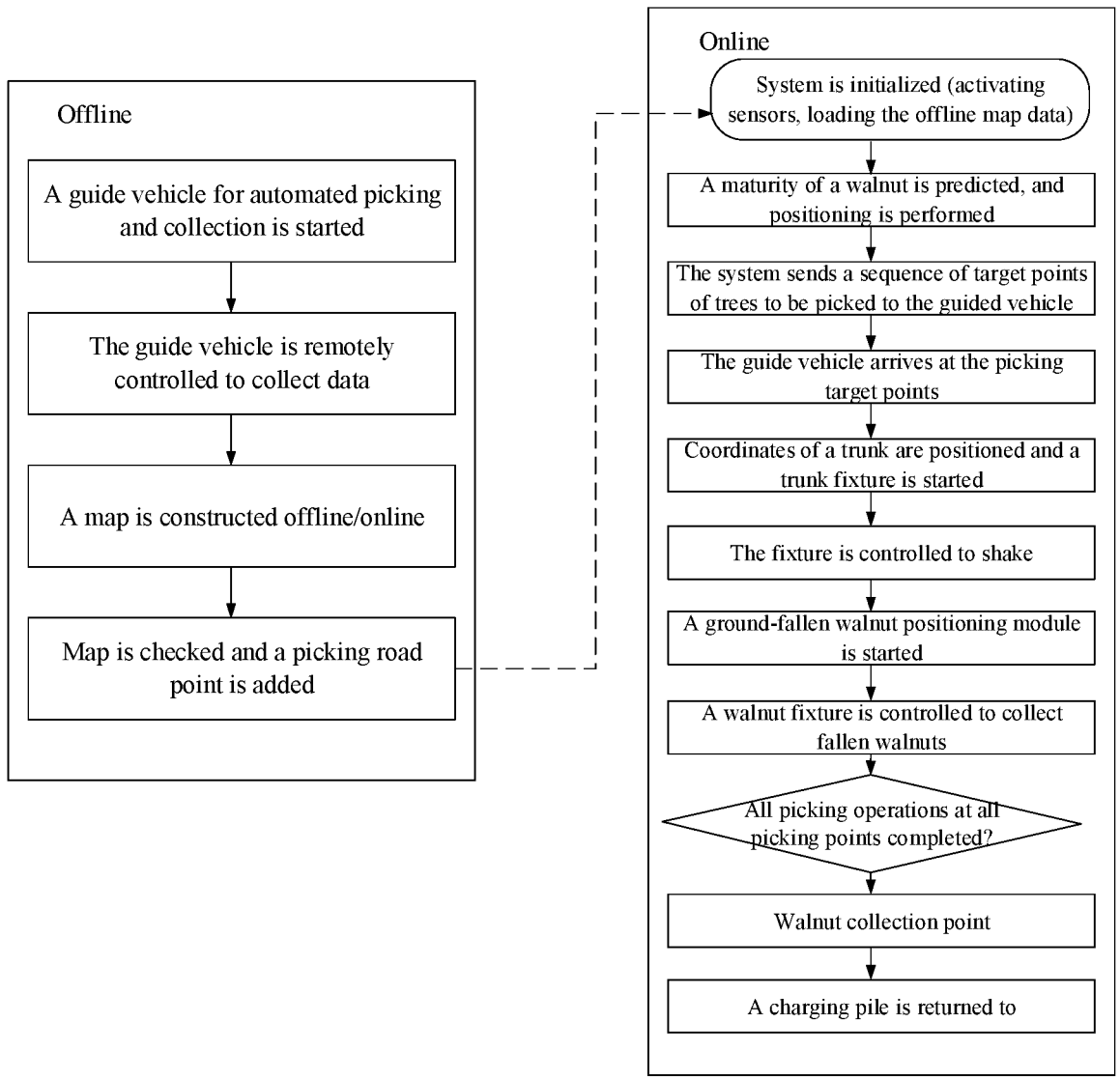
FIG. 1 is a flowchart of an operation of automated walnut picking according to an embodiment of the present disclosure.

Referring to FIG. 1, the offline module is configured to perform the following operations.

Figure 2:
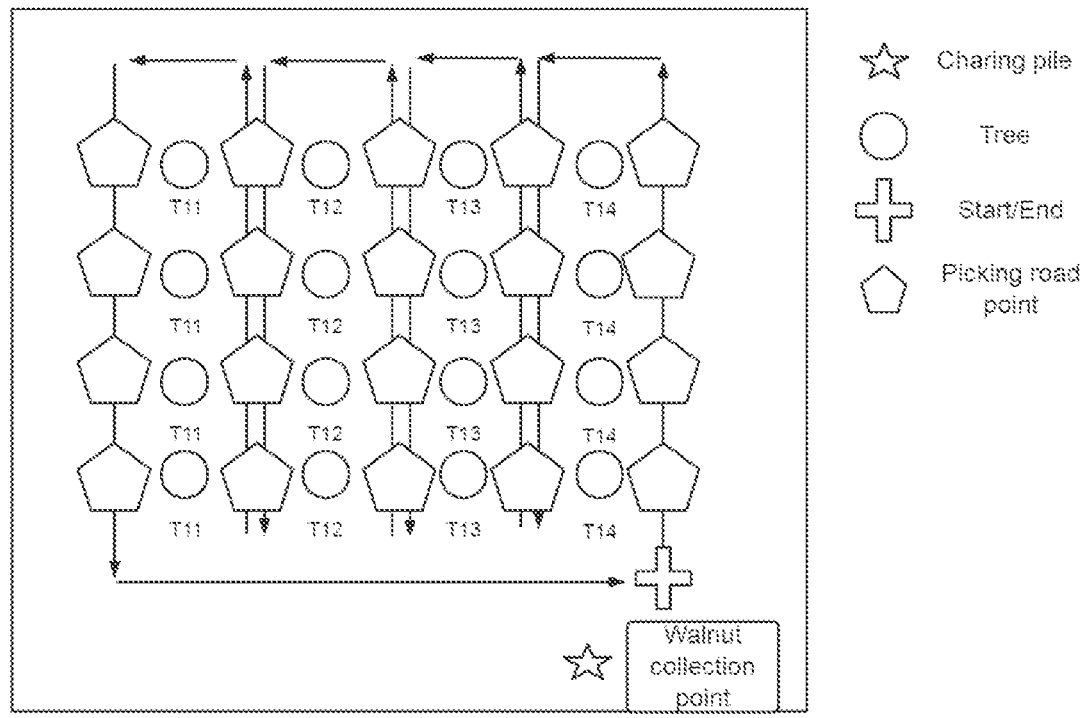
FIG. 2 is a schematic view of an environment of a fruit picking park according to an embodiment of the present disclosure.

Operation 1.1: When a guide vehicle for automated picking and collection is started, path planning is performed for the guide vehicle; the path planning follows a path closed loop principle, and a path required by the guide vehicle to travel for mapping is clarified. As an embodiment, the walking path of the guide vehicle may be the arrow path as shown in FIG. 2. The walking path can be adjusted multiple times according to the offline mapping effect.

Operation 1.2: The guide vehicle is remotely controlled to move in the park according to a predetermined rule, and laser data of the entire park is collected through a two-dimensional laser sensor arranged on the guide vehicle.

Operation 1.3: A two-dimensional offline/online map is constructed through a mapping module of SLAM. After the map is constructed, the map can be checked. According to a checking result, the map is fed back to the mapping module for intelligent learning to improve the accuracy of subsequent mapping.

The SLAM is based on vision, laser, odometer, IMU light sensor, etc., to instantly construct a map for navigation and positioning.

Operation 1.4: According to an actual situation of the park, a picking road point is marked on the map. The picking road point is required to be planned according to a radius of the picking robot to ensure that the picking path can cover a picking area of each tree (T11-T14 as shown in FIG. 2). As an embodiment, the schematic view of the environment of the fruit picking park shown in FIG. 2 illustrates relative positions of the picking road points and the fruit trees. In addition, FIG. 2 also illustrates positions of fruit collection points and charging piles of the guide vehicle.

The online module is configured for controlling of fruit online operation, adopting multi-sensor fusion technology and image recognition technology. The specific operations are as follows.

Operation 2.1: System initialization is performed through a system initialization module. After the picking robot is powered on, a robotic automated picking system is initialized, the sensor is activated, and the offline constructed map and the picking road point are loaded.

Operation 2.2: Walnut maturity is predicted and a target fruit tree is positioned through a walnut maturity prediction and positioning module, including: setting a robot patrol cycle according to a walnut maturity cycle; in each patrol cycle, detecting and predicting the maturity of each fruit tree through an image sensor on the picking robot combined with image recognition technology, where maturity=number of ripe walnuts/number of detected walnuts, and the count of ripe walnuts includes walnuts that are currently detected as not fully ripe, but are expected to be ripe at an upcoming picking time; then feeding the maturity result of each fruit tree back to a user interaction level, and after the user confirms the maturity a second time, adding coordinates of a confirmed corresponding fruit tree to a queue to be collected. The confirmed corresponding fruit tree is specifically a fruit tree of which the maturity exceeds a threshold.

Operation 2.3: The automated picking system determines and sends a picking task, including: according to the queue to be collected obtained in operation 2.2, when the number of the picking points in the queue meets a preset number N, sending the coordinates of the queue to be collected to the picking robot, preferably to the guide vehicle of the picking robot; and according to the coordinates, determining, by the picking robot, a corresponding order of picking according to a predetermined rule. The rule includes, but is not limited to, a Manhattan distance between a fruit tree and the robot, a fruit tree maturity, a manual designation, etc. The picking order can be determined according to the Manhattan distance between the fruit tree and the robot, fruit tree maturity, and manual designation.

Operation 2.4: The robot arrives at picking target points in sequence, including: taking a current point of the robot as a starting point and a first target picking point as an end point, planning a robot path and sending the robot path to the robot for execution; during the robot movement, matching data obtained from the two-dimensional/three-dimensional laser sensor or the image sensor with the offline map data, updating the robot coordinates at a certain frequency, and guiding the robot to move until an Euclidean distance between the robot coordinates and the first picking target point meets a threshold.

Operation 2.5: The robot locates trunk coordinates and starts a trunk fixture, including: recognizing the trunk in a field of view through the two-dimensional image sensor, obtaining depth information of a corresponding trunk recognized by the image sensor through the three-dimensional depth sensor, and selecting the nearest trunk as a target trunk to be clamped.

Figure 3:
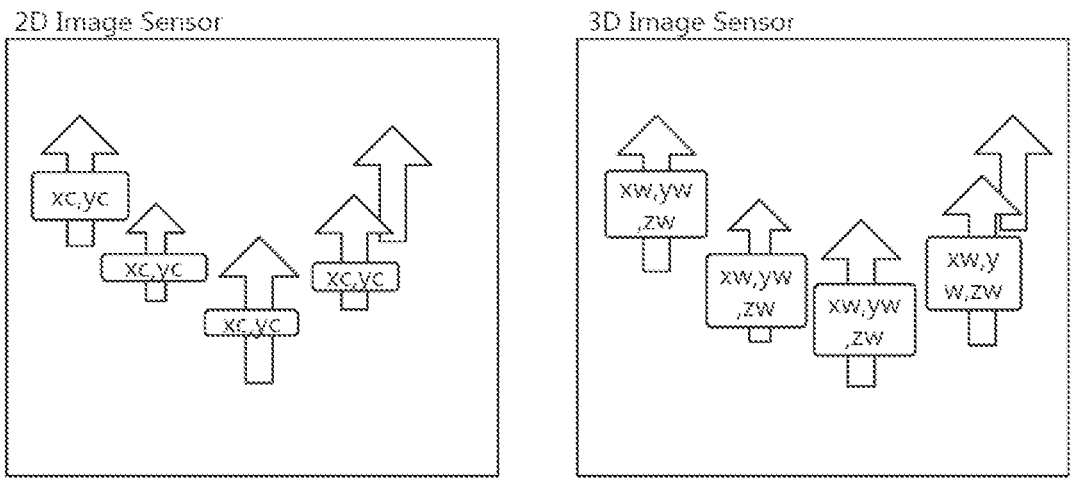
FIG. 3 is a schematic view of trunk positioning based on two-dimensional and three-dimensional data according to an embodiment of the present disclosure.
Figure 4:
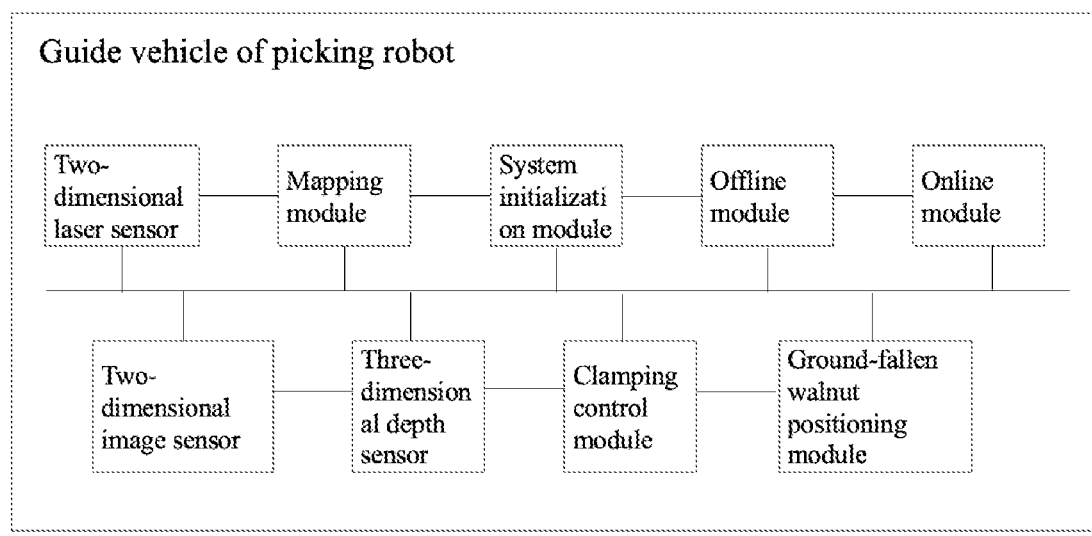
FIG. 4 is a schematic view of a guide vehicle of a picking robot according to an embodiment of the present disclosure.

As shown in FIG. 3, {xc,yc} represents the trunk coordinates in a pixel coordinate system, {xw,yw,zw} represents three-dimensional world coordinates of the trunk obtained according to the two-dimensional pixel coordinates and the three-dimensional sensor. The Euclidean distance between the three-dimensional coordinate sequence of the trunk and the current coordinates of the robot is calculated and sorted, and the nearest trunk is configured as the trunk to be clamped.

After determining the trunk to be clamped, a three-dimensional pose of the trunk is sent to a clamping control module, and the trunk fixture is controlled to clamp the trunk and is shaken at a certain frequency to complete the walnut shaking and falling operation.

Operation 2.6: Shaken walnuts are collected through a ground-fallen walnut positioning module, including: collecting ground image data of the ground-fallen walnuts through the two-dimensional image sensor, and detecting locations of the walnuts by an image recognition algorithm; obtaining the three-dimensional coordinates of each walnut through sensor calibration technology and the three-dimensional sensor, and controlling the walnut fixture to pick up each walnut and put the walnut into a walnut collection box.

Further, the image recognition algorithm and sensor calibration technology specifically include the following processes:

Step 1: collecting a certain number of walnut image samples, and manually labelling the walnuts in the image samples;

Step 2: training an offline image segmentation network model based on labeled data;

Step 3: collecting calibration board-corresponding coordinate data under two-dimensional and three-dimensional cameras through a calibration board, and calculating optimal external parameters of the two-dimensional and three-dimensional cameras based on the current data through singular value decomposition;

Step 4: software controlling the two-dimensional camera to take pictures and load the offline image segmentation network model;

Step 5: calling the segmentation network model to predict a walnut two-dimensional bounding box;

Step 6: converting the pixel coordinates {X_2d, Y_2d} of a center point of the two-dimensional bounding box to a three-dimensional camera coordinate system through the following formula;

$$s\begin{bmatrix}x_{p2d}\\y_{p2d}\\1\end{bmatrix}=M1\begin{bmatrix}X_{c2d}\\Y_{c2d}\\Z_{c2d}\\1\end{bmatrix}M2=\begin{bmatrix}x_{p3d}\\y_{p3d}\\1\end{bmatrix}\sim\begin{bmatrix}X_{c3d}\\Y_{c3d}\\Z_{c3d}\\1\end{bmatrix}$$

where p represents the pixel coordinate system, c represents the camera coordinate system, M1 represents internal parameters of the two-dimensional camera and the three-dimensional camera, M2 represents external parameters of the two-dimensional camera and the three-dimensional camera; ~ represents the relationship between the three-dimensional camera pixel coordinates and the camera coordinates, which is a known quantity;

Step 7: converting all two-dimensional coordinates of the walnut center point to the three-dimensional coordinate system; since there is no significant change in the size of the walnut, setting a search distance D based on three-dimensional coordinates; searching for all three-dimensional coordinates within the distance D based on a total punctuation of each three-dimensional walnut to obtain a three-dimensional coordinate set Ki of each walnut, where i represents the i-th walnut; calculating a three-dimensional coordinate normal vector of each set; combining the walnut three-dimensional coordinates, normal vector, and fixture length to filter the walnuts that can be grasped and set a grasping priority queue;

Step 8: according to the priority queue, controlling the fixture to pick up walnuts and put them into the walnut collection box.

Operation 2.7: All picking points are patrolled in sequence until the walnut picking operations at all picking points are completed, including: after picking at a current picking target point is completed, determining whether the picking operations at all picking points have been completed; when the picking operations at all picking points have not been completed, updating a next picking point to be collected as the first picking point in the queue, repeating operations 2.4 to 2.7 until the fruit trees in the queue to be collected are collected.

Operation 2.8: When all the picking operations are completed, the robot returns to a fruit collection point to collect all walnuts, and returns to the charging pile for charging until the next patrol cycle or picking instruction.

To ensure sufficient power during operation, the method may also include operations as followed.

Operation 2.9: For each time, the number of picking points in the collection queue, the length of the walking path of the robot, and the battery power consumed are recorded, and training and learning are performed based on the recorded data in a recent period to obtain and store the average power consumed at each picking point and the average power consumed per unit length of walking of the robot in a current state.

The operation 2.1 may further include that after the robot is powered on, the preset number N is intelligently set according to the current power, the average power consumed at each picking point, and the average power consumed per unit length of walking of the robot.

Since the power usage data is the data of the most recent period, the aging of the battery, the working conditions of the machine and other factors are fully considered, which can improve the reliability of operations and reduce the occurrence of power shortages.

The present disclosure realizes efficient and accurate fully automated walnut picking operation through the cooperation of multiple technologies.

The above descriptions are only the preferred embodiments of the present disclosure and are not intended to limit the present disclosure. Any modification, equivalent replacement, improvement, etc. made within the spirit and principle of the present disclosure shall be included in the scope of the present disclosure within.

What is claimed is:
1. An automated walnut picking and collection method based on multi-sensor fusion technology, comprising:

operation 1.1: when a guide vehicle of a picking robot for automated picking and collection is started, performing path planning for the guide vehicle;

operation 1.2: remotely controlling the guide vehicle to move in a park according to a first predetermined rule, and collecting laser data of the entire park through a two-dimensional laser sensor arranged on the guide vehicle;

operation 1.3: constructing a two-dimensional offline map through a mapping module of Simultaneous Localization and Mapping (SLAM);

operation 1.4: marking a picking road point on the two-dimensional offline map, wherein the picking road point is planned according to a radius of the picking robot to ensure that the planned path can cover a picking area of each of all fruit trees;

operation 2.1: performing system initialization through a system initialization module, comprising: after the picking robot is powered on, initializing an automated picking system, activating sensors, and loading the two-dimensional offline map and the picking road point;

operation 2.2: predicting a maturity of a walnut, positioning a target fruit tree from the all fruit trees, and obtaining a queue of picking road points to be collected, wherein the maturity is equal to the number of ripe walnuts divided by the number of detected walnuts;

operation 2.3: determining and sending, by the automated picking system, a picking task, comprising: according to the queue to be collected, in response to the number of picking road points in the queue meeting a preset number N, sending coordinates of the queue to be collected to the picking robot; and according to the coordinates, determining, by the picking robot, a corresponding order of picking according to a second predetermined rule;

operation 2.4: arriving, by the picking robot, at picking target points in sequence, comprising: taking a current point of the picking robot as a starting point and a first target picking point as an end point, planning the robot path and sending the robot path to the picking robot for execution; during movement of the robot, matching data obtained from the two-dimensional laser sensor with data of the two-dimensional offline map, updating coordinates of the picking robot at a certain frequency, and guiding the picking robot to move until an Euclidean distance between the coordinates of the picking robot and the first picking target point meets a threshold;

operation 2.5: locating, by the picking robot, coordinates of a trunk and starting a trunk fixture, comprising: recognizing a corresponding trunk in a field of view through a two-dimensional image sensor, obtaining depth information of the corresponding trunk recognized by the image sensor through a three-dimensional depth sensor, and selecting a nearest trunk as a target trunk to be clamped; after determining the trunk to be clamped, sending a three-dimensional pose of the target trunk to a clamping control module, controlling the trunk fixture to clamp the target trunk and shaking at a certain frequency to complete a walnut shaking and falling operation;

operation 2.6: collecting shaken walnuts through a ground-fallen walnut positioning module, comprising: collecting ground image data of ground-fallen walnuts through the two-dimensional image sensor, and detecting locations of the ground-fallen walnuts by an image recognition algorithm; obtaining three-dimensional coordinates of each ground-fallen walnut through sensor calibration technology and a three-dimensional sensor, and controlling a walnut fixture to pick up each ground-fallen walnut and put each ground-fallen walnut into a walnut collection box;

operation 2.7: patrolling all the picking road points in sequence until walnut picking operations at all picking road points are completed, comprising: after picking at a current picking target point is completed, determining whether the walnut picking operations at all picking points have been completed; in response to the walnut picking operations at the all picking points having not been completed, updating a next picking point to be collected as the first picking point in the queue to be collected, repeating the operations 2.4 to 2.7 until fruit trees in the queue to be collected are collected; and operation 2.8: in response to the walnut picking operations at the all picking points having been completed, returning, by the picking robot, to a fruit collection point to collect all the walnuts, wherein each of the first predetermined rule and the second predetermined rule comprises a Manhattan distance between a fruit tree and the picking robot, a fruit tree maturity, and a manual designation.

2. The method according to claim 1, wherein the operations 1.1 to 1.4 are performed by an offline module, and the operations 2.1 to 2.8 are performed by an online module.

3. The method according to claim 1, wherein the path planned in the operation 1.1 is a closed loop, and a path required by the guide vehicle to travel for mapping is clarified; a walking path is adjusted multiple times according to the two-dimensional offline map.

4. The method according to claim 1, after the constructing the two-dimensional offline map, further comprising: checking the two-dimensional offline map, and feeding the two-dimensional offline map to the mapping module to improve an accuracy of subsequent mapping.

5. The method according to claim 4, wherein the operation 2.2 further comprises: setting a robot patrol cycle according to a walnut maturity cycle; in the robot patrol cycle, detecting and predicting the maturity of each fruit tree through the two-dimensional image sensor on the picking robot combined with image recognition technology; and feeding a maturity result of each fruit tree back to a user interaction level, and after the maturity of a corresponding fruit tree is confirmed, adding coordinates of the confirmed corresponding fruit tree to a queue to be collected.

6. The method according to claim 1, wherein the nearest trunk is obtained by calculating the Euclidean distance between a three-dimensional coordinate sequence of each trunk and current coordinates of the picking robot and sorting.

7. The method according to claim 1, further comprising: returning, by the picking robot, to a charging pile for charging until a next patrol cycle or a next picking instruction.

8. The method according to claim 1, further comprising:
operation 2.9: recording the number of the picking road points in the queue, the length of a walking path of the picking robot, and the battery power consumed; and performing training and learning based on recorded data in a recent period to obtain and store the average power consumed at each picking point and the average power consumed per unit length of walking of the picking robot in a current state; and the operation 2.1 further comprises: setting the preset number N according to a current power, the average power consumed at each picking point, and the average power consumed per unit length of walking of the picking robot.

\* \* \* \* \*